US012597668B2

(12) United States Patent
Tan et al.

(10) Patent No.: US 12,597,668 B2
(45) Date of Patent: Apr. 7, 2026

(54) BATTERY PACK AND ELECTRIC VEHICLE

(71) Applicant: BYD COMPANY LIMITED, Shenzhen (CN)

(72) Inventors: Liangwen Tan, Shenzhen (CN); Jing Tan, Shenzhen (CN); Wenhui Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 612 days.

(21) Appl. No.: 18/078,508

(22) Filed: Dec. 9, 2022

(65) Prior Publication Data

US 2023/0163395 A1      May 25, 2023

Related U.S. Application Data

(63) Continuation of application No. PCT/CN2021/098082, filed on Jun. 3, 2021.

(30) Foreign Application Priority Data

Jun. 9, 2020    (CN) .......................... 202010515671.7

(51) Int. Cl.
*H01M 50/249*          (2021.01)
*B60L 58/26*          (2019.01)
(Continued)

(52) U.S. Cl.
CPC ........... *H01M 50/249* (2021.01); *B60L 58/26* (2019.02); *B60L 58/27* (2019.02); *H01M 10/6551* (2015.04); *H01M 10/6555* (2015.04)

(58) Field of Classification Search
CPC ........... H01M 50/249; H01M 10/6551; H01M 10/6555; H01M 10/625; H01M 10/617;
(Continued)

(56) References Cited

U.S. PATENT DOCUMENTS 5,731,568 A * 3/1998 Malecek ........... H01M 10/6567
                                                    180/68.5
6,106,972 A * 8/2000 Kokubo .................. B60L 58/26
                                                    429/120
(Continued)

FOREIGN PATENT DOCUMENTS

CN          100382382 C * 4/2008 .......... H01M 10/613
CN          104121797 A    10/2014
(Continued)

OTHER PUBLICATIONS

International Search Report and Written Opinion for Application No. PCT/CN2021/098082, mailed on Aug. 27, 2021, 10 pages.
(Continued)

*Primary Examiner* — Kaity V Chandler
(74) *Attorney, Agent, or Firm* — Sheppard Mullin Richter & Hampton LLP

(57) ABSTRACT
A battery pack includes a tray and a plate. The tray has an accommodating space. The accommodating space has a top opening. The plate is disposed at the top opening of the accommodating space. The plate includes an inner surface facing the accommodating space and an outer surface opposite to the inner surface. A plurality of cooling pipes sequentially arranged are disposed on the outer surface of the plate. A heating member is disposed between two adjacent cooling pipes.

20 Claims, 8 Drawing Sheets

(51) Int. Cl.
B60L 58/27 (2019.01)
H01M 10/6551 (2014.01)
H01M 10/6555 (2014.01)

(58) Field of Classification Search
CPC ............. H01M 10/647; H01M 50/258; H01M 50/271; H01M 10/6554; H01M 10/6571; H01M 50/209; H01M 10/613; H01M 10/6556; H01M 10/657; H01M 50/20; H01M 50/207; H01M 50/291; H01M 10/615; H01M 2220/20; B60L 58/26; B60L 58/27; B60L 50/64; Y02E 60/10; Y02T 10/70; B60K 1/00; B60K 2001/005; B60K 2001/008; B60Y 2400/112
See application file for complete search history.

(56) References Cited

U.S. PATENT DOCUMENTS

| | | | | | |
|---|---|---|---|---|---|
| 10,886,513 | B2 | * | 1/2021 | Stephens ............. | H01M 50/224 |
| 2011/0104548 | A1 | | 5/2011 | Saito et al. | |
| 2011/0206967 | A1 | | 8/2011 | Itsuki | |
| 2013/0108897 | A1 | * | 5/2013 | Christian ............ | H01M 10/647 |
| | | | | | 429/50 |
| 2016/0211559 | A1 | * | 7/2016 | Frohnmayer ..... | H01M 10/6556 |
| 2017/0256833 | A1 | * | 9/2017 | Ciaccio ................ | H01M 16/00 |
| 2018/0151924 | A1 | | 5/2018 | Baumann et al. | |
| 2018/0309176 | A1 | * | 10/2018 | Moschet .............. | F28D 1/0475 |
| 2018/0337377 | A1 | | 11/2018 | Stephens et al. | |
| 2023/0054479 | A1 | * | 2/2023 | Choi .................... | H01M 10/63 |

FOREIGN PATENT DOCUMENTS

| | | | | | | |
|---|---|---|---|---|---|---|
| CN | 104518258 | A | | 4/2015 | | |
| CN | 105914428 | A | | 8/2016 | | |
| CN | 107086337 | A | | 8/2017 | | |
| CN | 107534195 | A | | 1/2018 | | |
| CN | 207338482 | U | | 5/2018 | | |
| CN | 108682921 | A | * | 10/2018 | ......... | H01M 10/613 |
| CN | 208570855 | U | | 3/2019 | | |
| CN | 110048186 | A | | 7/2019 | | |
| CN | 209200022 | U | | 8/2019 | | |
| CN | 209496917 | U | | 10/2019 | | |
| CN | 110534836 | A | | 12/2019 | | |
| CN | 209730111 | U | * | 12/2019 | ............ | Y02E 60/10 |
| CN | 209747613 | U | | 12/2019 | | |
| CN | 209822833 | U | | 12/2019 | | |
| CN | 110739506 | A | * | 1/2020 | ......... | H01M 10/625 |
| CN | 210200917 | U | * | 3/2020 | ............ | Y02E 60/10 |
| CN | 210349887 | U | * | 4/2020 | ............ | Y02E 60/10 |
| CN | 210403972 | U | | 4/2020 | | |
| CN | 210489780 | U | * | 5/2020 | ............ | Y02E 60/10 |
| CN | 210535786 | U | | 5/2020 | | |
| CN | 210628453 | U | * | 5/2020 | ............ | Y02E 60/10 |
| CN | 212967870 | U | * | 4/2021 | ............ | Y02E 60/10 |
| CN | 213026257 | U | * | 4/2021 | ............ | Y02E 60/10 |
| CN | 112824135 | A | * | 5/2021 | ............. | B60K 1/04 |
| CN | 216145678 | U | * | 3/2022 | ............ | Y02E 60/10 |
| EP | 2343769 | B1 | | 7/2011 | | |
| JP | 2011181224 | A | | 9/2011 | | |
| JP | 5594801 | B1 | * | 9/2014 | ............ | Y02E 60/10 |
| JP | 2016161158 | A | * | 9/2016 | ........ | H01M 10/6567 |
| JP | 2017-027938 | A | | 2/2017 | | |
| JP | 2019515414 | A | | 6/2019 | | |
| JP | 2019-114460 | A | | 7/2019 | | |

OTHER PUBLICATIONS

First Search dated Jun. 6, 2022, issued in related Chinese Patent Application No. 202010515671.7 (1 page).

Supplementary Search dated Nov. 28, 2022, issued in related Chinese Patent Application No. 202010515671.7 (1 page).

Third Office Action and Supplementary Search dated Jun. 1, 2023, issued in related Chinese Patent Application No. 202010515671.7, with English machine translation (21 pages).

Extended European Search Report dated Nov. 17, 2021, issued in related European Patent Application No. 21175638.2 (11 pages).

Notice of Reasons for Refusal dated May 7, 2024, issued in related Japanese Patent Application No. 2022-575310, with English machine translation (8 pages).

Decision to Grant a Patent dated Sep. 3, 2024, issued in related Japanese Patent Application No. 2022-575310, with English machine translation (6 pages).

Request for the Submission of an Opinion dated May 15, 2025, issued in related Korean Patent Application No. 10-2023-7000413, with English machine translation (9 pages).

* cited by examiner

100

1000

100

BATTERY PACK AND ELECTRIC VEHICLE

CROSS-REFERENCE TO RELATED APPLICATIONS

The application is a continuation application of International Patent Application No. PCT/CN2021/098082 filed with the China National Intellectual Property Administration (CNIPA) on Jun. 3, 2021, which is based on and claims priority to and benefits of Chinese Patent Application No. 202010515671.7, filed on Jun. 9, 2020. The entire content of the above-referenced applications is incorporated herein by reference.

FIELD

This application relates to the field of batteries, and in particular to a battery pack and an electric vehicle.

BACKGROUND

Battery pack is the main power source of new-energy electric vehicles, and its quality directly affects the usage performance and safety performance of electric vehicles. In a battery pack structure, a tray is generally used to carry a power battery, and then the tray is sealed with a tray cover to form the battery pack. The battery pack is mounted on an electric vehicle.

As the battery pack generates heat while working, heat needs to be dissipated from the battery pack to prolong the service life of batteries in the battery pack. In addition, if the battery pack works at a low ambient temperature, the service life of the batteries in the low-temperature environment is also seriously shortened. In related arts, a battery pack is additionally equipped with a cooling system for heat dissipation, and a heating module is provided to heat the battery pack. The addition of the cooling system and the heating module lowers the space utilization of the battery pack. Therefore, how to improve the space utilization of the battery pack while ensuring the cooling and heating functions has become a technical problem that urgently needs to be solved.

SUMMARY

This application aims to solve the technical problems in related arts by providing a battery pack which not only can meet the heat dissipation requirements of the battery pack, but also can meet the need of heating the battery pack in a low-temperature environment and improve the space utilization of the battery pack.

To this end, this application proposes a battery pack, which is configured to provide power to a vehicle and includes a tray and a plate. The tray has an accommodating space. The accommodating space has a top opening. The plate is disposed at the top opening of the accommodating space. The plate includes an inner surface facing the accommodating space and an outer surface opposite to the inner surface. A plurality of cooling pipes sequentially arranged are disposed on the outer surface of the plate. A heating member is disposed between two adjacent cooling pipes.

In an embodiment of this application, the plate includes two first edge portions opposite to each other, the cooling pipe is an elongated pipe, and a length of the cooling pipe extends along a direction from one of the first edge portions to another one of the first edge portions.

In an embodiment of this application, a width of the plate extends along a first direction, a length of the plate extends along a second direction, the two first edge portions are disposed along the second direction, and the plurality of cooling pipes are sequentially arranged along the first direction; and a first end of each of the cooling pipes is disposed at the first one of the first edge portions, and a second end of each of the cooling pipes is disposed the second one of the first edge portions; and the cooling pipes are in communication with each other to form a cooling loop.

In an embodiment of this application, the battery pack further includes an inlet pipe, an outlet pipe and a transition pipe, the plurality of cooling pipes are grouped into at least one cooling unit, each cooling unit includes two cooling pipes, and the two cooling pipes are a first cooling pipe and a second cooling pipe; and an inlet of the first cooling pipe is in communication with the inlet pipe, an outlet of the first cooling pipe and an inlet of the second cooling pipe are both connected to the same transition pipe, and an outlet of the second cooling pipe is in communication with the outlet pipe.

In an embodiment of this application, the battery pack includes a plurality of cooling units, the plurality of cooling units are sequentially arranged along the first direction, and every two cooling units constitute one group; and the first cooling pipes of the two cooling units of the same group are in communication with the same inlet pipe, the second cooling pipes of the two cooling units of the same group are in communication with the same outlet pipe, the first cooling pipes of cooling units of different groups are in communication with different inlet pipes, the second cooling pipes of cooling units of different groups are in communication with different outlet pipes, and every cooling unit corresponds to/includes one transition pipe.

In an embodiment of this application, the battery pack further includes a plurality of cells placed in the accommodating space, the plurality of cells are sequentially arranged along the second direction, and a length of each of the plurality of cells extends along the first direction.

In an embodiment of this application, the heating member is an elongated heating member, and a length of the heating member extends along a direction from one of the first edge portions to another first edge portion; and the heating member is a heating film.

In an embodiment of this application, a thickness of the cooling pipe is greater than a thickness of the heating member; and the plate is formed integrally with the cooling pipe by extrusion.

In an embodiment of this application, the tray includes two first side beams and two second side beams for defining the accommodating space, the two first side beams are located on two opposite sides of the tray along the second direction, and the two second side beams are located on two opposite sides of the tray along the first direction; and the tray further includes a reinforcing beam, the reinforcing beam is disposed in the accommodating space and is parallel to the first side beam, and the plate is connected to the reinforcing beam.

In an embodiment of this application, the plate includes a carrying region for placing the cooling pipes and the heating member and a connecting region other than the carrying region; a thickness of the connecting region is greater than a thickness of the carrying region, and the plate is connected to the reinforcing beam at the connecting region; and two bosses are disposed on the inner surface of the plate facing the accommodating space, and the two bosses respectively abut against end surfaces of the reinforcing beam which are respectively close to the two second side beams.

In an embodiment of this application, the plate further includes two second edge portions opposite to each other, and the two second edge portions are respectively mounted on the two second side beams.

An inner surface of one of the second side beam and the second edge portion facing the accommodating space is provided with a groove, and another one of the second side beam and the second edge portion is inserted into the groove.

In an embodiment of this application, the second edge portion is fixed to the second side beam by adhesion.

In an embodiment of this application, the battery pack further includes a seal cover, where the seal cover is located on the plate and is connected to the tray to seal the top opening of the tray.

In an embodiment of this application, the battery pack further includes a sealing foam, where the sealing foam is located between the seal cover and the tray.

In an embodiment of this application, first threaded holes are provided on top surfaces of the first side beam and the second side beam facing the seal cover, and the seal cover is provided with second threaded holes corresponding to the first threaded holes.

In an embodiment of this application, the plate is provided with a connecting member configured to connect to a vehicle body of a vehicle, and the connecting member is connected to a transverse beam of a seat in the vehicle.

In an embodiment of this application, the tray is provided with lifting lugs, each of the lifting lugs is provided with a mounting hole for a fastener to pass through, and the fastener is passed through the mounting hole to fix the tray to the vehicle body of the vehicle.

In an embodiment of this application, each of the second side beams includes a vertical frame and a horizontal frame connected to each other, and a bottom of the cell is connected to the horizontal frame by a structural adhesive.

This application also provides an electric vehicle, including the battery pack according to any one of the above embodiments.

Other aspects and advantages of this application will be given in the following description, some of which will become apparent from the following description or may be learned from practices of this application.

DETAILED DESCRIPTION

Figure 1:
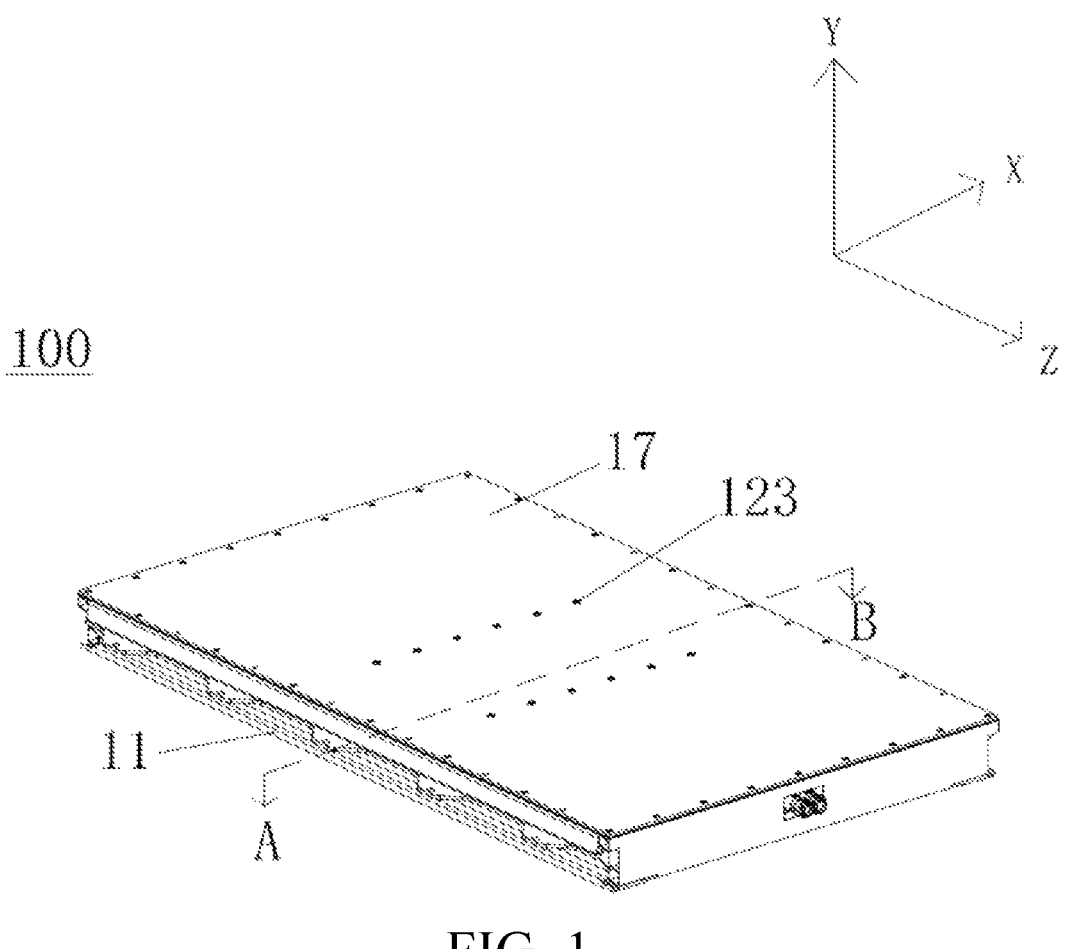
FIG. 1 is a schematic structural diagram of a battery pack according to an embodiment of this application.
Figure 2:
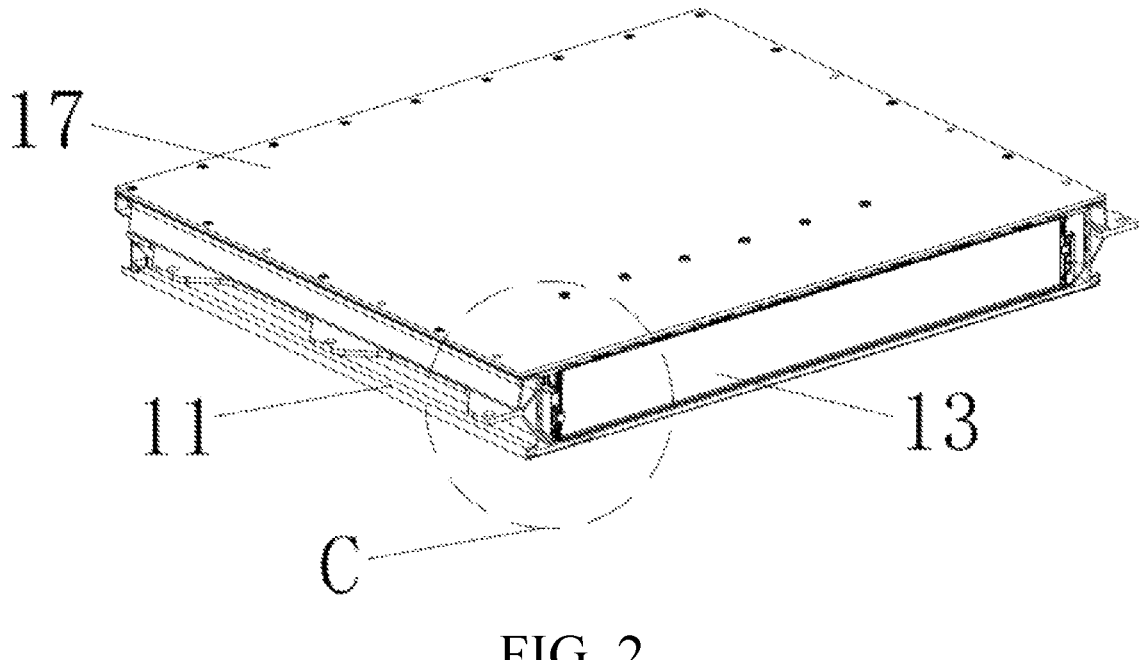
FIG. 2 is a cross-sectional view of the battery pack shown in FIG. 1 taken along a direction AB.

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, a feature defined to be "first" or "second" may explicitly or implicitly include one or more features. In the description of this application, unless otherwise stated, "a plurality of" means two or more than two.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the terms in this application according to specific situations.

In the battery pack according to the embodiments of this application, a plurality of cooling pipes sequentially arranged are disposed on the plate, so that the function of dissipating heat from the battery pack can be achieved by using the cooling pipes; and a heating member is disposed between adjacent cooling pipes, so that a function of heating the battery pack can be achieved. By integrating the cooling pipes and the heating member on the plate so that the heating member is disposed between the cooling pipes, the battery pack makes full use of the space of the plate, which can reduce the space of the battery pack occupied by the cooling pipes and the heating member, thereby improving the space utilization of the battery pack.

A battery pack of the embodiments of this application will be described below in detail with reference to FIG. 1 to FIG. 7.

Referring to FIG. 1 to FIG. 7, in a battery pack embodiment provided by this application, a battery pack 100 is configured to provide power to an electric vehicle and includes a tray 11 and a plate 12. The tray 11 has an accommodating space 110. The accommodating space 110 is configured to accommodate cells 13. The accommodating space 110 has a top opening. The plate 12 is disposed at the top opening of the accommodating space 110, so that the plate 12 can cover the top opening of the accommodating space 110. The battery pack 100 further includes a plurality of cells 13. The plurality of cells 13 are placed in the accommodating space 110.

The plate 12 includes an inner surface facing the accommodating space 110 and an outer surface opposite to the inner surface. A plurality of cooling pipes 14 sequentially arranged are disposed on the outer surface of the plate 12. A heating member 15 is disposed between two adjacent cooling pipes 14. Therefore, the cooling pipes 14 can achieve the function of dissipating heat from the battery pack 100, and the heating member 15 can achieve the function of heating the battery pack 100 in a low-temperature environment, to ensure the performance and service life of the cells. In addition, by integrating the cooling pipes 14 and the heating member 15 on the plate 12, the embodiments of this application make full use of the space between the cooling pipes 14 to dispose the heating member 15, which can reduce the space of the battery pack 100 occupied by the cooling pipes 14 and the heating member 15, thereby improving the space utilization of the battery pack 100.

The battery pack 100 may further include a thermally conductive structural adhesive 20. The thermally conductive structural adhesive 20 is connected between the inner surface of the plate 12 and the cell 13, to facilitate the transfer of heat from the cell 13 to the plate 12.

The heating member 15 may be a heating film, and may be fixed on the plate 12 by adhesion.

Figure 4:
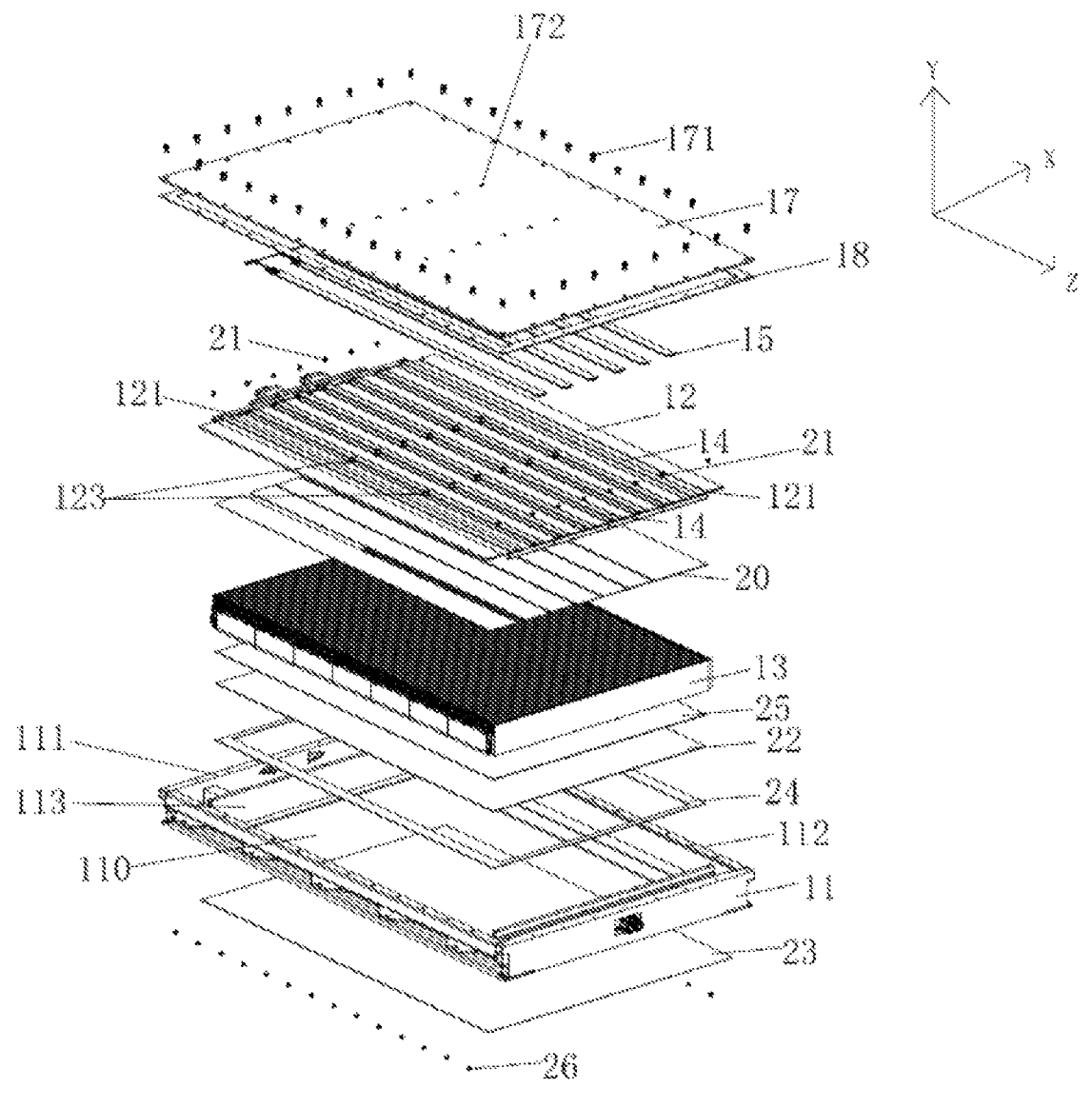
FIG. 4 is a schematic exploded view of a battery pack according to an embodiment of this application.

In some embodiments of this application, the battery pack 100 is a square battery pack, and correspondingly, the tray 11 and the plate 12 are both square. As shown in FIG. 4, the plate 12 includes two first edge portions 121 opposite to each other. The cooling pipe 14 is an elongated pipe. A length of the cooling pipe 14 extends along a direction from one of the first edge portions 121 to another first edge portion 121. In other words, the cooling pipe 14 is disposed on the plate 12 along a second direction Z.

Further, a width of the plate 12 extends along a first direction. The first direction is a width direction of the tray 11. As shown in FIG. 4, the first direction is a direction X. A length of the plate 12 extends along a second direction. The second direction is a length direction of the tray 11. As shown in FIG. 4, the second direction is the direction Z. The two first edge portions 121 are two opposite sides of the plate 12 along the second direction Z, and the plurality of cooling pipes 14 are sequentially arranged along the first direction X.

A first end of the cooling pipe 14 is disposed on one of the first edge portions 121, and a second end of the cooling pipe 14 is disposed on another first edge portion 121. The cooling pipes 14 are in communication with each other to form a cooling loop.

Figure 5:
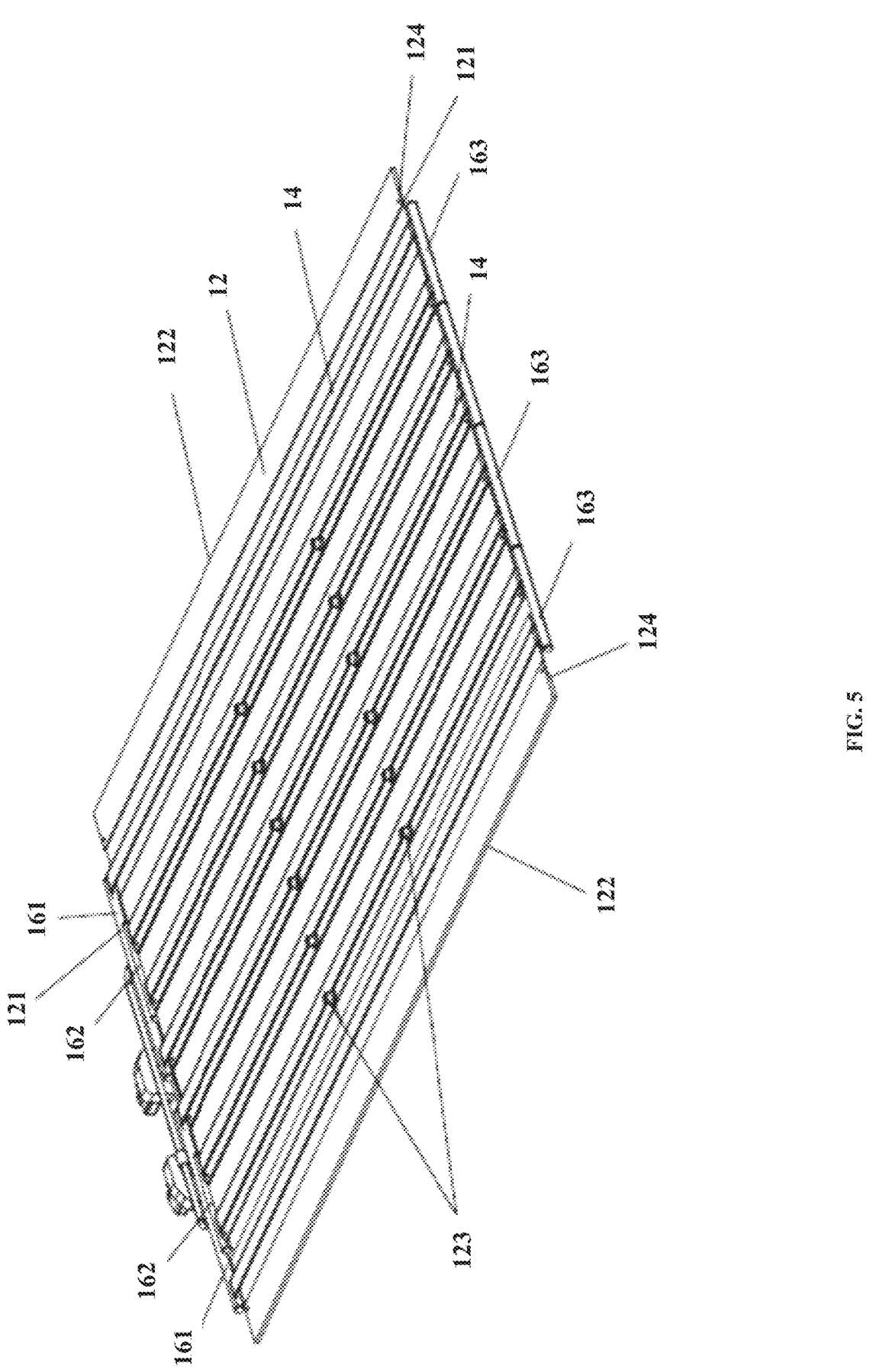
FIG. 5 is a schematic diagram showing that cooling pipes are integrated on a plate according to an embodiment of this application.

Specifically, the battery pack 100 further includes an inlet pipe 161, an outlet pipe 162 and a transition pipe 163. The plurality of cooling pipes 14 are grouped into at least one cooling unit. Each cooling unit includes two cooling pipes, namely, a first cooling pipe and a second cooling pipe respectively. As shown in FIG. 5, the plurality of cooling pipes 14 are grouped into four cooling units. An inlet of the first cooling pipe is in communication with the inlet pipe 161, an outlet of the first cooling pipe and an inlet of the second cooling pipe are both connected to the same transition pipe 163, and an outlet of the second cooling pipe is in communication with the outlet pipe 162. Therefore, a coolant enters the first cooling pipe from the inlet pipe 161, then flows through the transition pipe 163 to the second cooling pipe, and then flows out from the outlet pipe 162, thus achieving a function of cooling the battery pack 100.

A plurality of cooling units are sequentially arranged along the first direction X, and every two cooling units constitute one group. The first cooling pipes of the two cooling units of the same group are in communication with the same inlet pipe 161. The second cooling pipes of the two cooling units of the same group are in communication with the same outlet pipe 162. The first cooling pipes of cooling units of different groups are in communication with different inlet pipes. The second cooling pipes of cooling units of different groups are in communication with different outlet pipes. Every cooling unit corresponds to one transition pipe. By means of the above method, circulating cooling of the coolant can be realized. In addition, the flow path of the coolant flowing from the inlet pipe 161 to the outlet pipe 162 only passes through two cooling pipes, and the small number of cooling pipes allows the coolant to still have a low temperature when flowing into the latter cooling pipe, thereby improving the cooling effect of the coolant.

In an embodiment of this application, the cooling pipe 14 and the plate 12 may be integrally formed by extrusion from an aluminum material, or the cooling pipe 14 and the plate 12 may also be disposed separately. When disposed separately, the cooling pipe 14 may be connected to the plate 12 through a thermally conductive adhesive.

In an embodiment of this application, the plurality of cells 13 are sequentially arranged along the second direction Z, i.e., the plurality of cells 13 are sequentially arranged along the length direction of the tray 11, and the length of each of the plurality of cells 13 extends along the first direction X. Therefore, for the cooling pipes 14, each cooling pipe 14 covers all the cells 13, which improves the heat dissipation effect. Of course, in other embodiments, the plurality of cells 13 may also be sequentially arranged along the first direction X, and the length of the cell 13 extends along the second direction Z.

Figure 6:
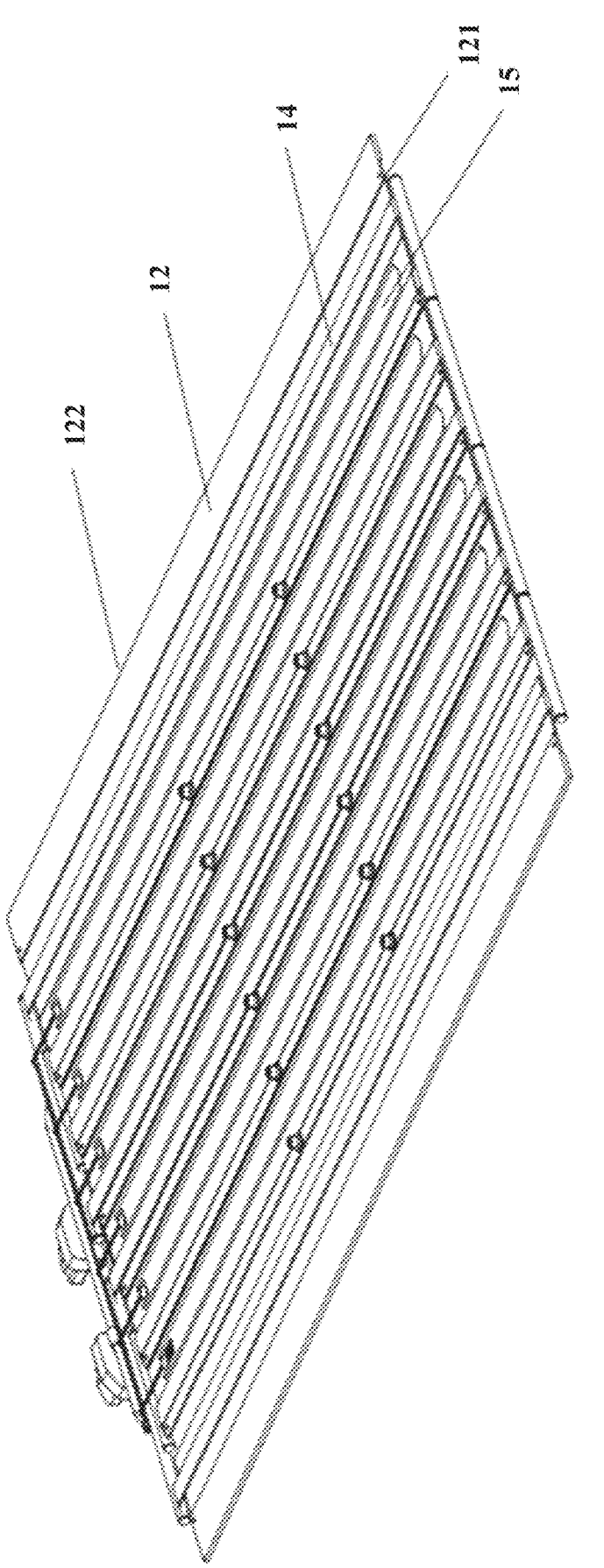
FIG. 6 is a schematic diagram showing that cooling pipes and a heating member are integrated on a plate according to an embodiment of this application.

In an embodiment of this application, as shown in FIG. 6, the heating member 15 is an elongated heating member, and the length of the heating member 15 extends along a direction from one of the first edge portions 121 to another first edge portion 121, i.e., the heating member 15 is disposed on the plate 12 in the second direction Z.

In an embodiment of this application, as shown in FIG. 4, the battery pack 100 further includes a seal cover 17 and a sealing foam 18. The seal cover 17 is located on the plate 12 and is connected to the tray 11 to seal the top opening of the tray 11. The sealing foam 18 is located between the seal cover 17 and the tray 11 to enhance the sealing between the seal cover 17 and the tray 11. Further, the seal cover 17 may be fixed to the tray 11 by bolts 171, or the seal cover 17 may also be fixed to the tray 11 by riveting, welding or other means. In addition, the sealing foam 18 is resilient.

In an embodiment of this application, a thickness of the cooling pipe 14 is greater than a thickness of the heating member 15. It should be noted that the thicknesses of the cooling pipe 14 and the heating member 15 are thickness along a third direction Y. The third direction is a height (thickness) direction of the tray 11. That is to say, on the basis of the diagram shown in FIG. 4, the thickness of the cooling pipe 14 and the thickness of the heating member 15 extend along the third direction Y. Making the thickness of the cooling pipe 14 greater than the thickness of the heating member 15 can effectively prevent friction between a seal cover 17 and the heating member 15, thereby protecting the heating member 15.

Figure 7:
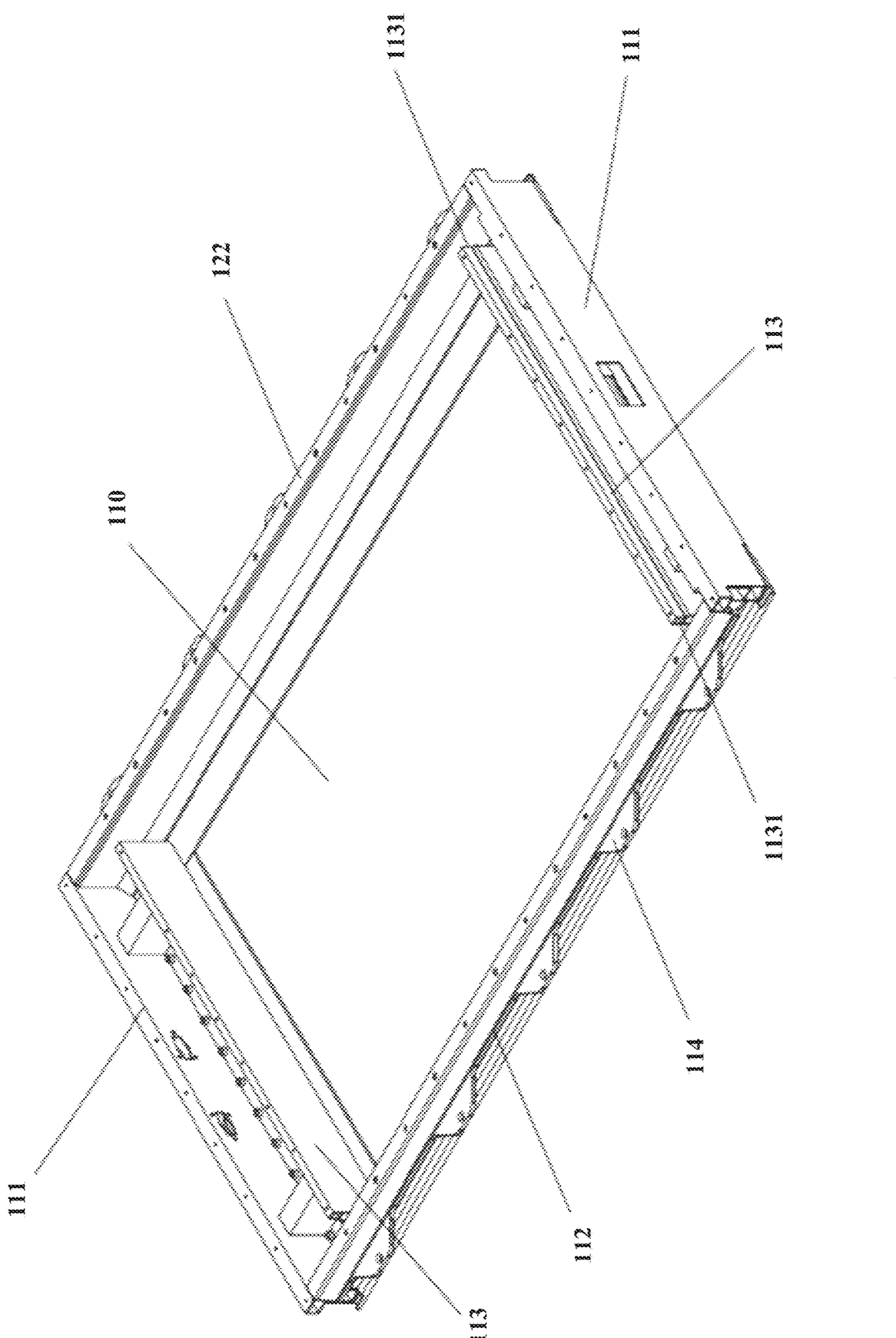
FIG. 7 is a schematic structural diagram of a tray according to an embodiment of this application.
Figure 8:
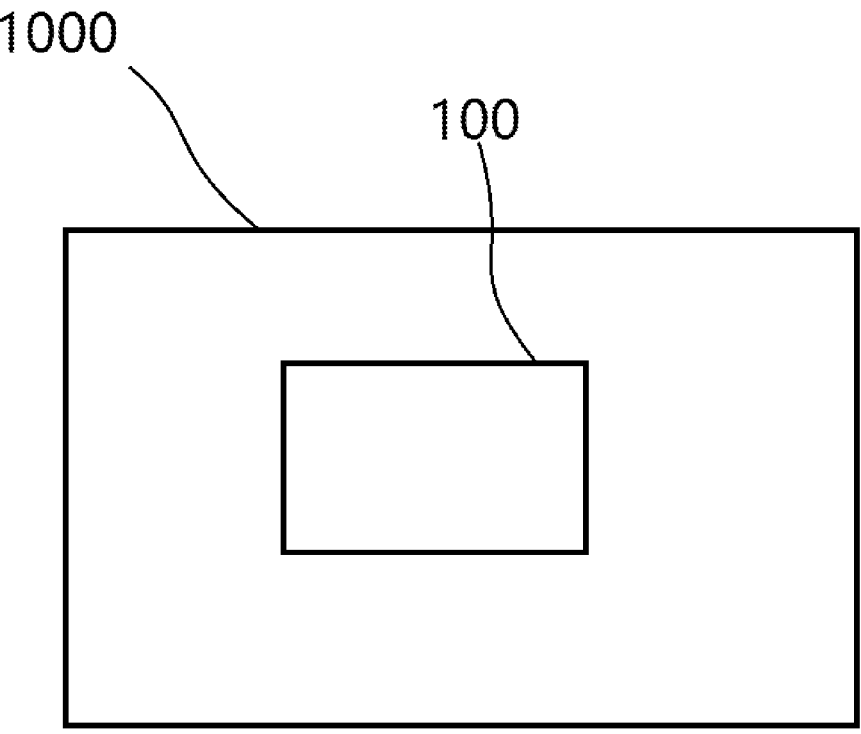
FIG. 8 is a schematic structural diagram of a vehicle according to an embodiment of this application.

In an embodiment of this application, referring to FIG. 4, FIG. 5 and FIG. 7, the tray 11 includes two first side beams 111 and two second side beams 112 for defining the accommodating space 110, the two first side beams 111 are located on two opposite sides of the tray 11 along the second direction Z, the two second side beams 112 are located on two opposite sides of the tray 11 along the first direction X, and the first side beams 111 and the second side beams 112 are connected to form a square tray 11. In addition, the plate 12 further includes two second edge portions 122 opposite to each other, the positions of the two first edge portions 121 of the plate 12 correspond one-to-one to those of the two first side beams 111 of the tray 11, the positions of the two second edge portions 122 correspond one-to-one to those of the two second side beams 112 of the tray 11, and the second edge portions 122 are mounted on the corresponding second side beams 112.

Threaded holes may be provided on top surfaces of the first side beam 111 and the second side beam 112 facing the seal cover 17, and the seal cover 17 is also provided with corresponding threaded holes, so that the bolts 171 are engaged with the threaded holes of the first side beam 111, the second side beam 112 and the threaded holes on the seal cover 17, so as to fix the seal cover 17 to the tray 11.

The tray 11 further includes a reinforcing beam 113. The reinforcing beam 113 is disposed in the accommodating space 110 and is parallel to the first side beam 111. Further, there may be two reinforcing beams 113, with one reinforcing beam 113 being disposed adjacent to one of the first side beams 111, and another reinforcing beam 113 being disposed adjacent to another first side beam 111. The strength of the tray 11 can be enhanced by the reinforcing beams 113.

The plate 12 is connected to the reinforcing beam 113. Specifically, the inner surface of the plate 12 is connected to a top surface of the reinforcing beam 113 facing the plate 12. For example, the plate 12 and the reinforcing beam 113 may be fixed to each other by bolts 21. To be specific, threaded holes are provided on a top surface of the plate 12 corresponding to the reinforcing beam 113, and corresponding threaded holes are also provided on the top surface of the reinforcing beam 113, so that the plate 12 and the reinforcing beam 113 are fixed to each other through the engagement of the threaded holes with the bolts 21. In other embodiments, the plate 12 may also be connected to the reinforcing beam 113 by welding.

In an embodiment of this application, the plate 12 includes a carrying region for placing the cooling pipe 14 and the heating member 15 and a connecting region other than the carrying region, and a thickness of the connecting region is greater than a thickness of the carrying region. In other words, the plate 12 is divided into two regions, where one part is used for placing the cooling pipes 14 and the heating member 15, and another part is used as the connecting region. A position where the plate 12 is connected to the reinforcing beam 113 is located in the connecting region with a larger thickness, which enhances the strength at the position where the plate 12 is connected to the reinforcing beam 113, and can effectively inhibit the cell 13 from swelling after multiple times of charging and discharging.

The plate 12 is further provided with a connecting member 123. The connecting member 123 is configured to connect to a vehicle body of a vehicle. Any structure in an electric vehicle other than the battery pack may be considered as part of the vehicle body of the vehicle. For example, the connecting member 123 is connected to a transverse beam of a seat in the vehicle to increase the vibration modes of the battery pack 100. More specifically, as shown in FIG.

4, a through hole 172 is provided on the seal cover 17 at a position corresponding to the connecting member 123 of the plate 12, and the connecting member 123 extends out of the battery pack 100 through the through hole 172, so as to be connected to the vehicle body. The connecting member 123 may be, for example, a fixing nut. Each fixing nut is sleeved with a sealing ring. The fixing nuts may be connected to the vehicle body by brazing.

In addition, the connecting member 123 may be disposed in the connecting region of the plate 12, i.e., a position where the plate 12 is connected to the vehicle body is located at the connecting region with a larger thickness, which improves the firmness of the battery pack 100 on the vehicle.

In an embodiment of this application, as shown in FIG. 7, the tray 11 is further provided with lifting lugs 114. The lifting lug 114 is provided with a mounting hole and is fixed to the vehicle body of the vehicle through the mounting hole and by, for example, using a bolt, so as to mount the tray 11 on the vehicle body. Therefore, by fixing the tray 11 to the vehicle body and fixing the plate 12 to the vehicle body, the firmness of the battery pack 100 on the vehicle can be further improved, thereby further reducing the shaking of the battery pack during the driving of the vehicle.

In an embodiment of this application, as shown in FIG. 5, two bosses 124 are disposed on the inner surface of the plate 12 facing the accommodating space 110, and the two bosses 124 are respectively located on the two second edge portions 122 and respectively abut against end surfaces 1131 of the reinforcing beam 113 which are respectively close to the two second side beams 112. Specifically, the reinforcing beam 113 includes the two end surfaces of 1131 respectively facing the second side beams 112, one of the bosses 124 of the plate 12 abuts against one of the end surfaces 1131, and another boss 124 abuts against another end surface 1131. Therefore, when a side of the plate 12 is compressed or impacted by an external force, part of the force can be transferred to the reinforcing beam 113, which prevents the plate 12 from tangential displacement.

The boss 124 is a boss structure protruding outward from the inner surface of the plate 12, i.e., the boss 124 and the plate 12 are integrally formed.

Figure 3:
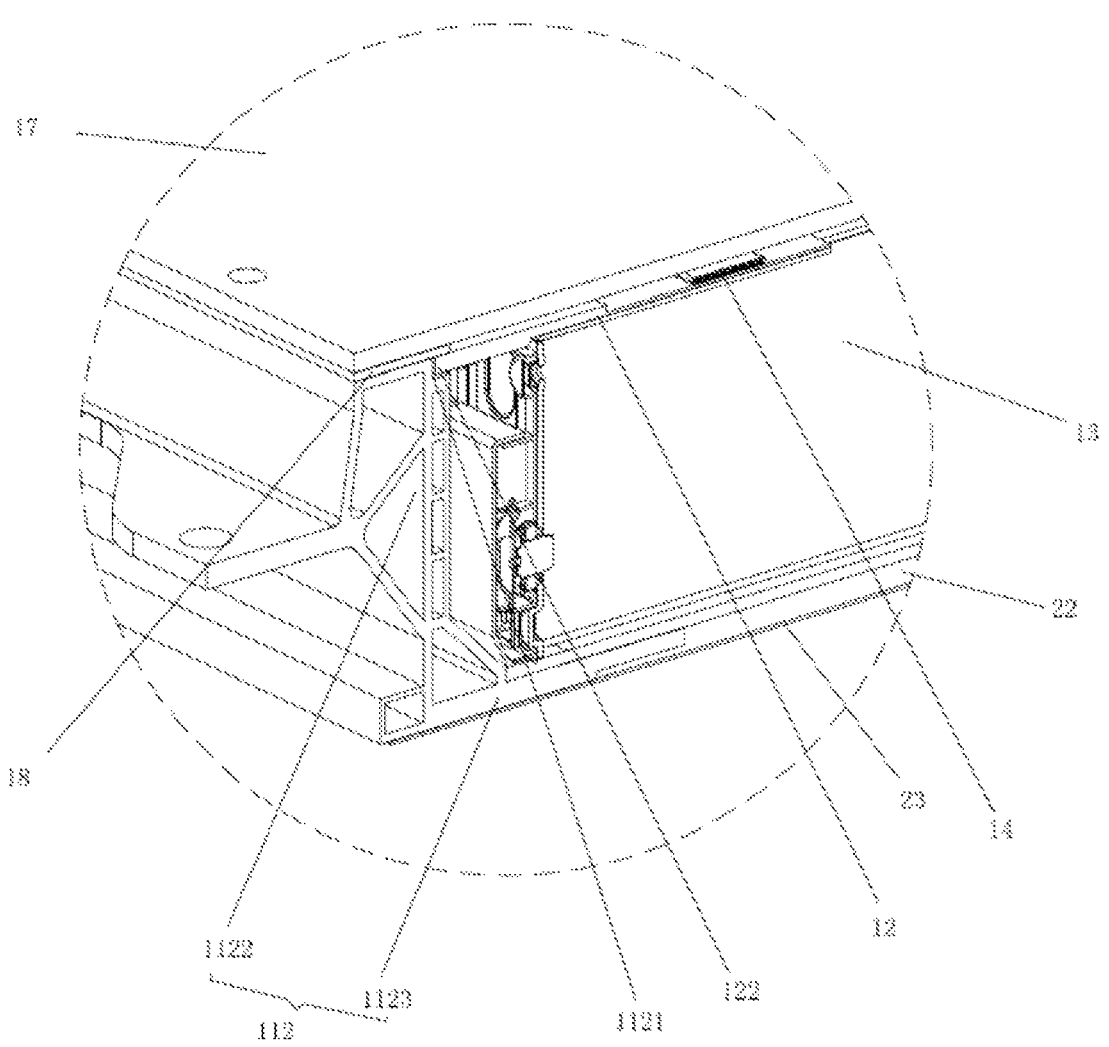
FIG. 3 is a schematic enlarged view of a dashed line box C in FIG. 2.

As shown in FIG. 3, the inner surface of the second side beam 112 facing the accommodating space 110 is provided with a groove 1121, and the second edge portion 122 of the plate 12 is inserted into the groove 1121. The groove 1121 may be, for example, an L-shaped groove as shown in the figure, or may also be a recess structure. Therefore, by the configuration of the groove 1121, the edge of the plate 12 is inserted into the groove 1121, so that when the second side beam 112 is compressed or impacted, the force can be transferred to the plate 12 by the second side beam 112 to make use of the plate 12 to improve the compression resistance of the second side beam 112, thereby reducing the possibility of deformation of the second side beam 112 due to compression.

In this application, the second edge portion 122 of the plate 12 and the second side beam 112 are further glued together.

In addition, the length of each of the plurality of cells 13 of this application extends along the first direction X. The cell 13 includes poles for outputting a current. The poles are located at one or more ends of the cell 13 along the first direction. Positive and negative poles may be located at the same end of the cell 13 along the first direction X, or may be located at opposite ends of the cell 13 along the first direction X, i.e., the poles of the cell 13 are disposed facing the second side beam 112. By providing the groove 1121 on the second side beam 112 to connect to the plate 12, when the second side beam 112 is compressed or impacted, the impact force can be transferred to the plate 12, and the impact force is transferred from the plate 12 to casings of the cells 13 by the thermally conductive structural adhesive 20, thereby improving the compression resistance of the second side beam 112 to prevent the second side beam 112 from deforming and compressing the poles of the cells 13 to cause a short circuit between the cells 13.

In some other embodiments, the second edge portion 122 of the plate 12 may be provided with a groove, and the top of the second side beam 112 is inserted into the groove of the second edge portion 122. In this way, the impact force received by the second side beam 112 can also be transferred to the plate 12, thereby improving the compression resistance of the second side beam 112.

In an embodiment of this application, the second side beam 112 may be an L-shaped structure, including a vertical frame 1122 and a horizontal frame 1123. The horizontal frame 1123 is located at a bottom opening of the accommodating space 110, and the horizontal frames 1123 of the two second side beams 112 are disposed opposite to each other to jointly define the bottom opening of the accommodating space 110. The top opening and the bottom opening of the accommodating space 110 are disposed opposite to each other along a third direction. The third direction is the direction Y shown in FIG. 4. The battery pack 100 further includes a base plate 22 and a protection plate 23. The base plate 22 is connected to the horizontal frame 1123 to close the bottom opening of the accommodating space 110, and is coplanar with the horizontal frame 1123 to jointly carry the cells 13.

The battery pack 100 further includes structural adhesives 24 and 25. The bottom of the cell 13 is connected to the horizontal frame 1123 by the structural adhesive 25, and the base plate 22 is connected to the horizontal frame 1123 by the structural adhesive 24, so as to seal the bottom opening of the accommodating space 110. The protection plate 23 is located on the side of the base plate 22 facing away from the cell 13, and is fixed to the horizontal frame 1123, for example, threadedly connected to the horizontal frame 1123 by bolts 26.

By adhering the cell 13 to the base plate 22 and then adhering the base plate 22 to the horizontal frame 1123, the compression force received by the second side beam 112 can be transferred to the casing of the cell 13, which can further improve the compression resistance of the tray 11.

An embodiment of this application also provides an electric vehicle, including a battery pack. The battery pack is a battery pack described in any one of the above embodiments.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of this application. In this specification, schematic descriptions of the foregoing terms are not necessarily directed at a same embodiment or example. Moreover, the specific features, structures, materials, or characteristics described may be combined in any one or more embodiments or examples in an appropriate manner.

Although the embodiments of this application have been shown and described, persons of ordinary skill in the art should understand that various changes, modifications, replacements and variations may be made to the embodiments without departing from the principles and spirit of this application, and the scope of this application is as defined by the appended claims and their equivalents.

What is claimed is:

1. A battery pack, comprising:
a tray, wherein the tray has an accommodating space, and the accommodating space has a top opening;
a plate disposed at the top opening, the plate comprises an inner surface facing the accommodating space and an outer surface opposite to the inner surface, a plurality of cooling pipes sequentially disposed on the outer surface of the plate, and a heating member disposed between two adjacent cooling pipes; and
at least one inlet pipe, and at least one outlet pipe,
wherein:
the cooling pipes are grouped into a plurality of cooling units, the cooling units are arranged along a first direction, each of the cooling units comprises a first cooling pipe and a second cooling pipe, and every two adjacent cooling units constitute a cooling group; and
first cooling pipes of the two adjacent cooling units of a same cooling group are in communication with a same inlet pipe, second cooling pipes of the two adjacent cooling units of the same cooling group are in communication with a same outlet pipe, first cooling pipes of cooling units of different groups are in communication with different inlet pipes, and second cooling pipes of cooling units of different groups are in communication with different outlet pipes.

2. The battery pack according to claim 1, wherein the plate comprises two first edge portions opposite to each other, and a length of the cooling pipes extends along a direction from a first one of the two first edge portions to a second one of the two first edge portions.

3. The battery pack according to claim 2, wherein a width of the plate extends along the first direction, a length of the plate extends along a second direction, the two first edge portions are disposed along the second direction, and the plurality of cooling pipes are sequentially arranged along the first direction; and
a first end of each of the cooling pipes is disposed at the first one of the two first edge portions, and a second end of each of the cooling pipes is disposed on the second one of the two first edge portions.

4. The battery pack according to claim 3, wherein the battery pack further comprises a transition pipe,
an inlet of a first cooling pipe is in communication with the at least one inlet pipe, an outlet of the first cooling pipe and an inlet of a second cooling pipe are both connected to the transition pipe, and an outlet of the second cooling pipe is in communication with the at least one outlet pipe.

5. The battery pack according to claim 3, further comprising a plurality of cells placed in the accommodating space, wherein the plurality of cells are sequentially arranged along the second direction, and a length of each of the plurality of cells extends along the first direction.

6. The battery pack according to claim 2, wherein a length of the heating member extends along the direction from the first one of the two first edge portions to the second one of the two first edge portions; and
the heating member comprises a heating film.

7. The battery pack according to claim 1, wherein the battery pack further comprises transition pipes, and every cooling unit comprises one of the transition pipes connecting the first cooling pipe and the second cooling pipe of the cooling unit.

8. The battery pack according to claim 1, wherein a thickness of the cooling pipes is greater than a thickness of the heating member.

9. The battery pack according to claim 1, wherein the tray comprises two first side beams and two second side beams for defining the accommodating space, the two first side beams are located on two opposite sides of the tray along a second direction, and the two second side beams are located on two opposite sides of the tray along the first direction; and the tray further comprises a reinforcing beam, the reinforcing beam is disposed in the accommodating space and is parallel to the first side beams, and the plate is connected to the reinforcing beam.

10. The battery pack according to claim 9, wherein the plate comprises a carrying region for placing the cooling pipes and the heating member and a connecting region other than the carrying region;

a thickness of the connecting region is greater than a thickness of the carrying region, and the plate is connected to the reinforcing beam at the connecting region; and two bosses are disposed on the inner surface of the plate facing the accommodating space, and the two bosses respectively abut against end surfaces of the reinforcing beam, wherein the end surfaces of the reinforcing beam are respectively close to the two second side beams.

11. The battery pack according to claim 9, wherein the plate further comprises two second edge portions opposite to each other, and the two second edge portions are respectively mounted on the two second side beams.

12. The battery pack according to claim 11, wherein an inner surface of one of a second side beam and a second edge portion facing the accommodating space is provided with a groove, and another one of the second side beam and the second edge portion is inserted into the groove.

13. The battery pack according to claim 12, wherein the second edge portion is fixed to the second side beam by adhesion.

14. The battery pack according to claim 12, further comprising a seal cover, wherein the seal cover is located on the plate and is connected to the tray to seal the top opening of the tray.

15. The battery pack according to claim 14, further comprising a sealing foam, wherein the sealing foam is located between the seal cover and the tray.

16. The battery pack according to claim 14, wherein first threaded holes are provided on top surfaces of a first side beam and a second side beam facing the seal cover, and the seal cover is provided with second threaded holes corresponding to the first threaded holes.

17. The battery pack according to claim 9, wherein each of the second side beams includes a vertical frame and a horizontal frame connected to each other, and a bottom of a cell is connected to the horizontal frame by a structural adhesive.

18. The battery pack according to claim 1, wherein the plate is provided with a connecting member configured to connect to a vehicle body of a vehicle, and the connecting member is connected to a transverse beam of a seat in the vehicle.

19. The battery pack according to claim 18, wherein the tray comprises lifting lugs, each of the lifting lugs comprises a mounting hole for a fastener to pass through, and the fastener is passed through the mounting hole to fix the tray to the vehicle body of the vehicle.

20. An electric vehicle, comprising a battery pack, wherein the battery pack comprises:

a tray, wherein the tray has an accommodating space, and the accommodating space has a top opening;

a plate disposed at the top opening, the plate comprises an inner surface facing the accommodating space and an outer surface opposite to the inner surface, a plurality of cooling pipes sequentially disposed on the outer surface of the plate, and a heating member disposed between two adjacent cooling pipes; and at least one inlet pipe, and at least one outlet pipe, wherein:

the cooling pipes are grouped into a plurality of cooling units, the cooling units are arranged along a first direction, each of the cooling units comprises a first cooling pipe and a second cooling pipe, and every two adjacent cooling units constitute a cooling group; and first cooling pipes of the two adjacent cooling units of a same cooling group are in communication with a same inlet pipe, second cooling pipes of the two adjacent cooling units of the same cooling group are in communication with a same outlet pipe, first cooling pipes of cooling units of different groups are in communication with different inlet pipes, and second cooling pipes of cooling units of different groups are in communication with different outlet pipes.

\* \* \* \* \*